C. LA COUR.
RESILIENT TIRE.
APPLICATION FILED JULY 17, 1919.
1,349,163. Patented Aug. 10, 1920.
3 SHEETS—SHEET 1.
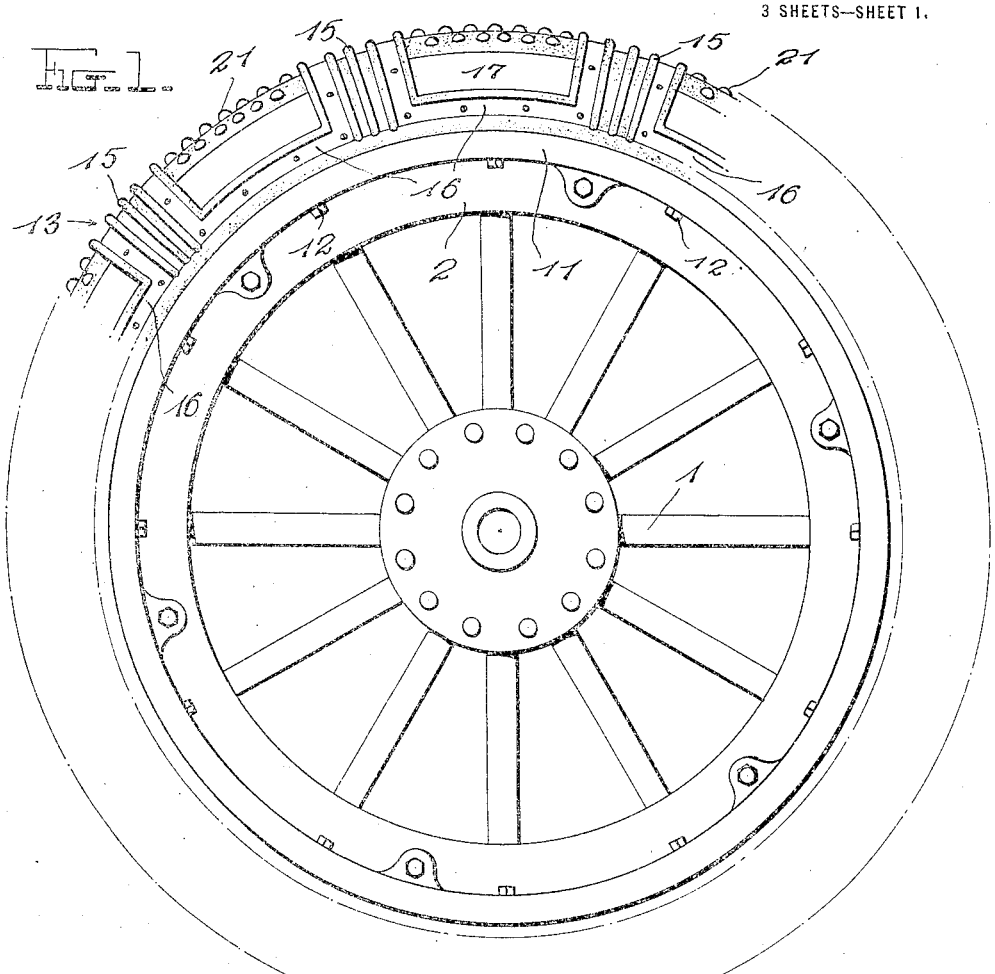
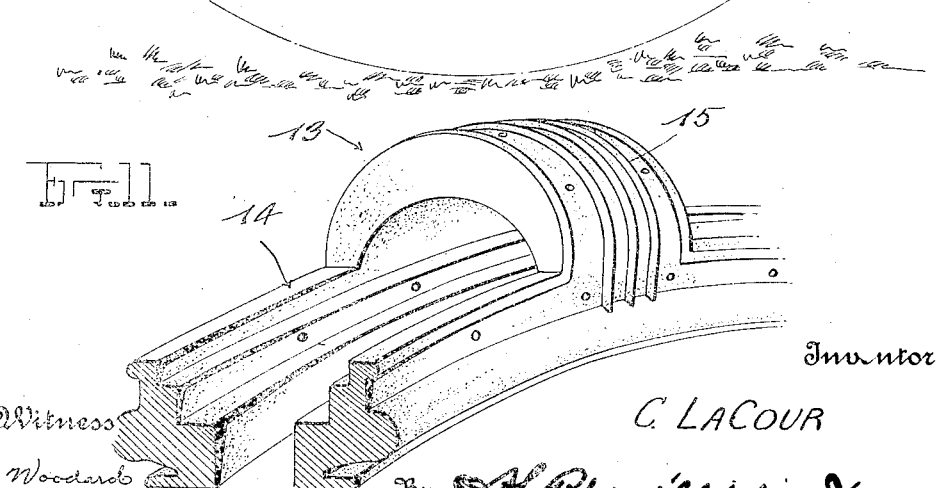

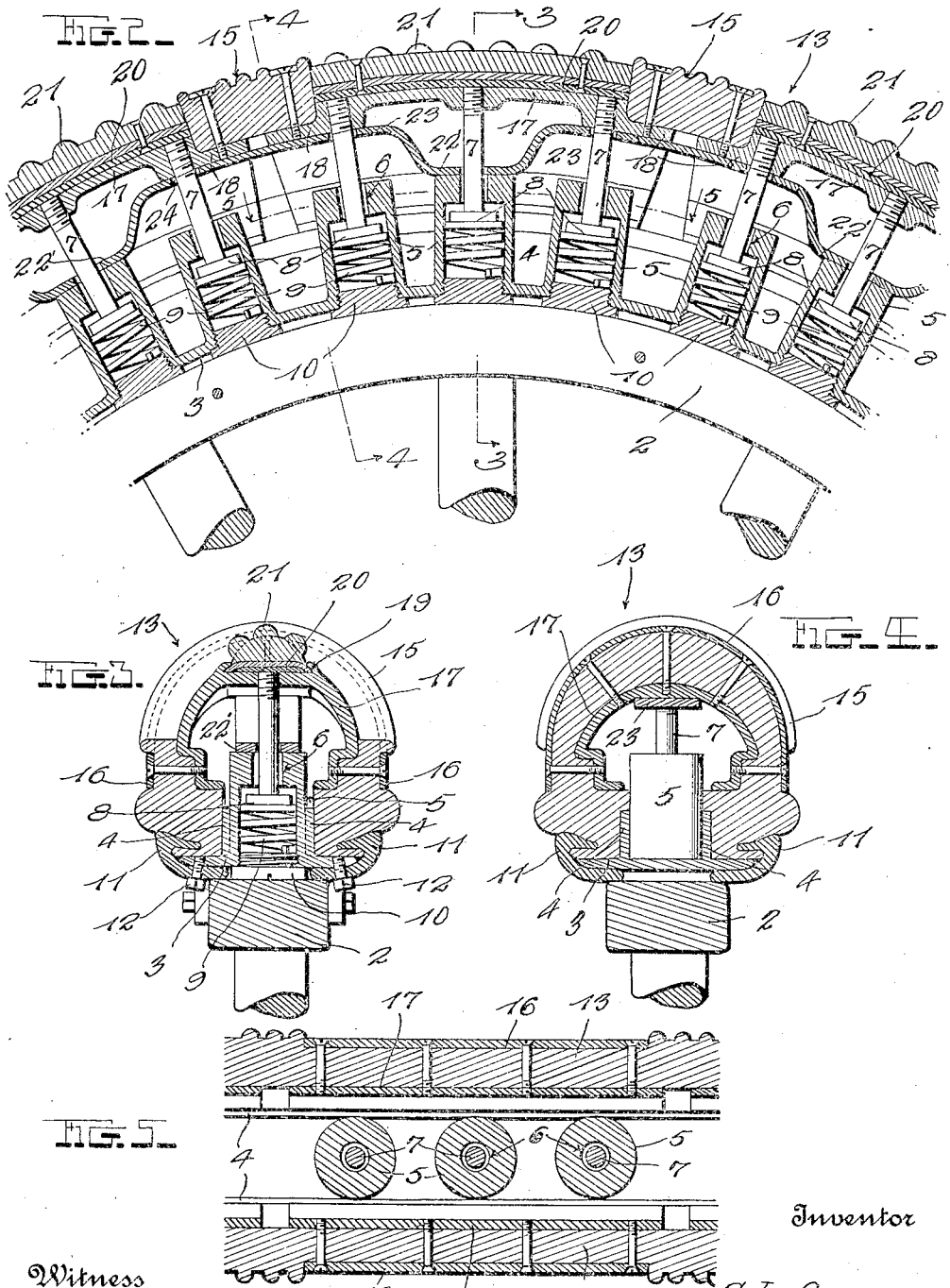

C. LA COUR.
RESILIENT TIRE.
APPLICATION FILED JULY 17, 1919.
1,349,163.
Patented Aug. 10, 1920.
3 SHEETS—SHEET 3.
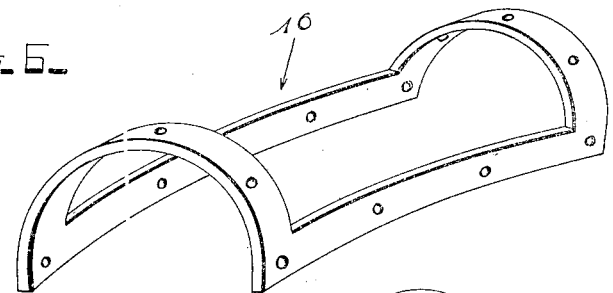
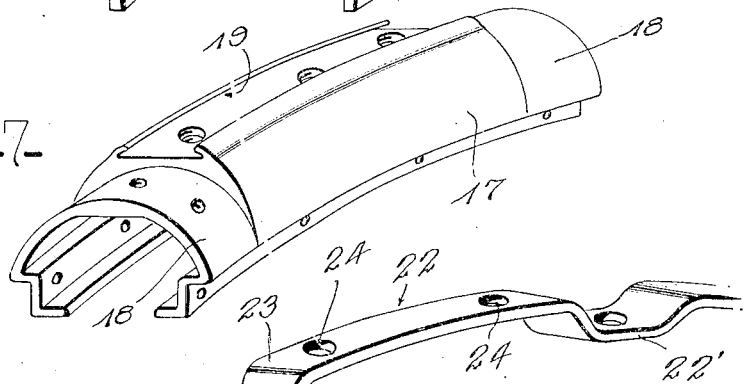
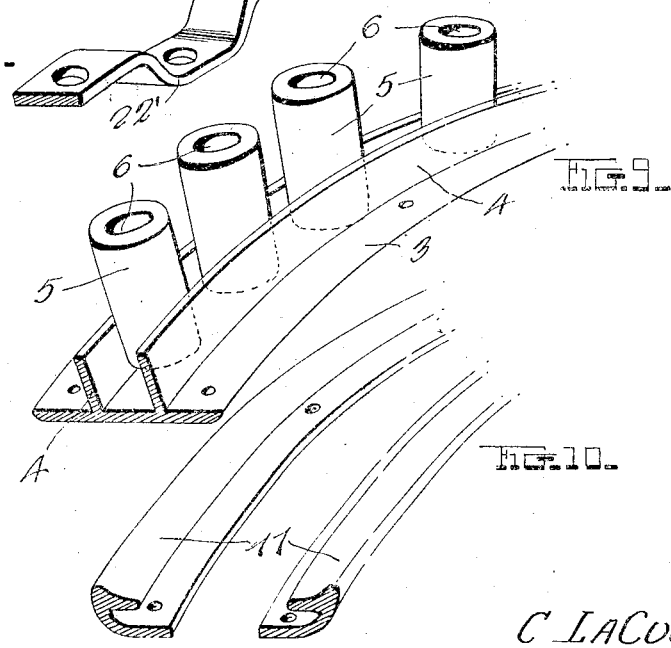
Witness
H. Woodard
Inventor
C. La Cour
By H. R. Williamson & Co.
Attorneys

UNITED STATES PATENT OFFICE.

CARL LA COUR, OF DIXON, ILLINOIS.

RESILIENT TIRE.

1,349,163.  Specification of Letters Patent.  Patented Aug. 10, 1920.

Application filed July 17, 1919. Serial No. 311,428.

*To all whom it may concern:*

Be it known that I, CARL LA COUR, a citizen of the United States, residing at Dixon, in the county of Lee and State of Illinois, have invented certain new and useful Improvements in Resilient Tires; and I do declare the following to be a full, clear, and exact description of the invention, such as will enable others skilled in the art to which it appertains to make and use the same.

This invention relates to certain new and useful improvements in resilient tires.

The primary object of the invention is to provide a tire which will take the place of the ordinary pneumatic and rubber cushion tires and which will have all of the resiliency that these tires have, this resiliency being effected by a novel combination of spring members and cushion elements.

Another object of the invention is to provide a tire with means capable of propelling it out of mud holes or the like.

A further object of the invention is to generally improve upon devices of this class by the provision of a comparatively simple, strong, durable and inexpensive construction, one which will be efficient and reliable in operation, and well adapted to the purpose for which it is designed.

With these and other objects in view, the invention consists of certain novel features of construction and the combination and arrangement of parts as will be hereinafter fully described and claimed.

In the accompanying drawings in which similar reference characters designate like parts throughout the several views:—

Figure 1 is a side elevation of a wheel having a tire constructed in accordance with this invention;

Fig. 2 is a longitudinal sectional view of a portion of the tire;

Figs. 3 and 4 are transverse sectional views of the tire taken on the planes indicated by the lines 3—3 and 4—4 respectively of Fig. 2;

Fig. 5 is a sectional view taken substantially on the line 5—5 of Fig. 2;

Fig. 6 is a perspective view of one of the stiff reinforcing members for the tire casing;

Fig. 7 is a perspective view of one of the inflexible tire sections;

Fig. 8 is a perspective view of a portion of the spring band;

Fig. 9 is a similar view of a portion of the rim;

Fig. 10 is a similar view of a portion of the clencher rims; and,

Fig. 11 is a perspective view of a portion of the cushion tire casing.

Referring more particularly to the drawings, numeral 1 designates a vehicle wheel having a felly 2 to which is attached in any suitable manner a circular rim 3 having formed integral therewith parallel flanges 4 and radially extending cylinders 5. These cylinders 5 are arranged in sets of three, and have their outer ends pierced by apertures 6, through which extend the stems 7 of pistons or plungers 8, the latter being pressed outwardly by coil springs 9 disposed between the plungers 8 and caps 10 which are threaded in the inner ends of the cylinders. These caps may be used in adjusting the tension of the springs 9.

Clamped upon the rim 3 by means of clencher rims 11 which are secured to the latter by screws 12 is a cushion tire casing 13. This tire casing is cut out at intervals as at 14 and the remaining adjacent tread portions 15 are connected by metal reinforcing members 16, the latter consisting of substantially rectangular open frames, the sides of which are connected to the sides of the tire casing while their ends are arched and connected to the ends of the tread portions of the same.

The outer ends of the plunger stems 7 are threaded into openings arranged in metal inflexible tire sections 17, one set of three plungers forming the mounting for one tire section. These tire sections are disposed in the cut out portions 14 of the tire casing and are semi-cylindrical in shape with their ends reduced as at 18 to conform to the shape of the inner sides of the tread portion 15 of the tire casing and to lap under the same. The screws which secure the reinforcing members 16 to the tire casing are shown as being threaded into the tire section, but this is not necessary. The tread portions of the tire sections 17 are provided with longitudinally extending channels or grooves 19 and sliding into these and anchored therein in any suitable manner are the bases 20 of cushion tread members 21, the latter forming a continuous tread with the tread portions 15 of the tire casing. In view of the fact that the tire sections 17 are of less width than the tire casing, the ends of the tread portions 15 of the latter project beyond the tire sections and partake of the nature of propelling shoes or wings which may prove very effective when the vehicle is stuck in a mud hole.

The numeral 22 represents a spring band which is sinuous and which is disposed with its innermost portions 22' resting against the cylinders 5 and its outermost portions 23 bearing against the ends of the tire sections 17. The band 22 is provided with apertures 24 through which extend the stems 7 of the plungers 8.

When there is pressure applied to different portions of the tire the various tire sections will be forced inwardly compressing the coil springs 9 and flattening to some extent the spring band 22. As the tire sections 17 have their inner sides resting against the sides of the tire casing 13 the tire casing will be compressed and this forms an additional cushion means. All the parts of the tire are connected together in such a manner that they can not come apart and rattle, and dirt or water cannot easily find access to the exterior of the same.

From the foregoing description, taken in connection with the accompanying drawings, the construction, use and operation of the invention will be readily understood without a more extended explanation.

As various changes in form, proportion and in the minor details of construction may be resorted to without departing from the spirit of the invention, it is to be understood that I do not wish to be limited to the construction herein shown and described other than as claimed.

I claim:

1. In a device of the character described, the combination of a rim, a cushion tire casing mounted upon said rim and having its tread cut out at intervals, and tire sections yieldably mounted upon said rim and disposed in the cut out portions of said tire casing, the tread portions of said tire sections forming a continuous tread with the remaining tread portions of said tire casing.

2. In a device of the character described, the combination of a rim, a cushion tire casing mounted upon said rim and having its tread cut out at intervals, stiff reinforcing members attached to said tire casing and connecting adjacent tread portions thereof, and tire sections yieldably mounted upon said rim and disposed in the cut out portions of said tire casing, the tread portions of said tire sections forming a continuous tread with the tread portions of said tire casing.

3. In a device of the character described, the combination of a rim, a cushion tire casing mounted upon said rim and having its tread cut out at intervals, stiff rectangular frames having their sides attached to the sides of said tire casing between adjacent tread portions and their ends arched and attached to said adjacent tread portions of said tire casing, and tire sections yieldably mounted upon said rim and disposed in the cut out portions of said tire casing, the tread portions of said tire sections forming a continuous tread with the tread portions of said tire casing.

4. In a device of the character described, the combination of a tire casing having its tread cut out at intervals, and tire sections yieldably mounted within said tire casing at the cut out portions thereof and with their tread portions forming a continuous tread with the tread portions of said tire casing, said tire sections being of less width than said tire casing so that the ends of the tread portions of the latter partake of the nature of propelling shoes.

5. In a device of the character described, the combination of a tire casing having its tread cut out at intervals, and tire sections yieldably mounted within said tire casing at the cut out portions thereof and with their tread portions forming a continuous tread with the tread portions of said tire casing, the ends of said tire sections being shaped to conform to the shape of the inner sides of the tread portions of the tire casing and lapping under the same.

6. In a device of the character described, the combination of a cushion tire casing having its tread cut out at intervals, inflexible tire sections yieldably mounted within said tire casing at the cut out portions thereof, and cushion tread members fixed longitudinally upon said tire sections and forming a continuous tread with the tread portions of said tire casing.

7. In a device of the character described, the combination of a cushion tire casing having its tread cut out at intervals, inflexible tire sections yieldably mounted within said tire casing at the cut out portions thereof, said tire sections having longitudinal channels at their tread portions, and cushion tread members having their bases slid in and fastened in said channels, said tread members forming a continuous tread with the tread portions of said tire casing.

8. In a device of the character described, the combination of a rim, a cushion tire casing mounted upon said rim and having its tread cut out at intervals, and tire sections yieldably mounted upon said rim and disposed in the cut out portions of said tire casing with their tread portions forming a continuous tread with the tread portions of the latter, said tire casing having portions disposed between said rim and said tire sections to provide additional cushioning for the latter.

9. In a device of the character described, the combination of a rim, radial spring pressed plungers mounted upon said rim, tire sections carried by said plungers, and a spring band bearing against said tire sections to provide further cushioning for the same.

10. In a device of the character described, the combination of a rim, a cushion tire casing mounted upon said rim, spring pressed plungers mounted upon said rim, tire sections carried by said plungers, said sections bearing against portions of said tire casing, and a spring band bearing against said tire sections.

11. In a device of the character described, the combination of a rim, a cushion tire casing mounted upon said rim and having its tread cut out at intervals, radial cylinders mounted upon said rim, spring pressed plungers mounted in said cylinders and having their stems projecting out of the same, inflexible tire sections carried by the stems of said plungers and disposed in the cut out portions of said tire casing, said tire sections bearing against portions of said tire casing, and a sinuous spring band having portions bearing against the ends of some of said cylinders and other portions bearing against said tire sections.

In testimony whereof I have hereunto set my hand.

CARL LA COUR.